United States Patent
Kiuchi et al.

(10) Patent No.: US 8,016,385 B2
(45) Date of Patent: Sep. 13, 2011

(54) PRINTER AND PRINTING METHOD

(75) Inventors: Takashi Kiuchi, Tomi (JP); Noriyuki Miyagoshi, Tomi (JP); Tadashi Kishida, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 692 days.

(21) Appl. No.: 12/120,482

(22) Filed: May 14, 2008

(65) Prior Publication Data
US 2008/0284805 A1    Nov. 20, 2008

(30) Foreign Application Priority Data

May 17, 2007   (JP) ................. 2007-131305

(51) Int. Cl.
B41J 2/15   (2006.01)
B41J 2/145   (2006.01)
(52) U.S. Cl. .......................... 347/41; 347/16
(58) Field of Classification Search ............. 347/9, 12, 347/14, 15, 16, 40, 41, 43, 54, 101
See application file for complete search history.

(56) References Cited

U.S. PATENT DOCUMENTS
5,992,962 A * 11/1999 Yen et al. .............. 347/9

FOREIGN PATENT DOCUMENTS
JP  2003-145731   5/2003
JP  2006-110750   4/2006

* cited by examiner

Primary Examiner — Thinh H Nguyen
(74) Attorney, Agent, or Firm — Ditthavong Mori & Steiner, P.C.

(57) ABSTRACT

A printer including a feeding unit configured to perform repeated feeding of a medium for a predetermined feeding distance in a predetermined feeding direction, a print head configured to print on a printing surface of the medium in a printing zone set each time the feeding unit performs a feeding of the medium for the feeding distance, and a printing pass setting unit configured to set the printing zone containing a plurality of printing passes. The printing pass setting unit sets the printing passes such that boundaries between the printing passes extend diagonally relative to a width direction of the medium that is perpendicular to the feeding direction. The printing pass setting unit can set the printing passes such that the boundaries between the printing passes extend in waveform in the width direction with oscillation of the waveform being in the feeding direction.

8 Claims, 4 Drawing Sheets

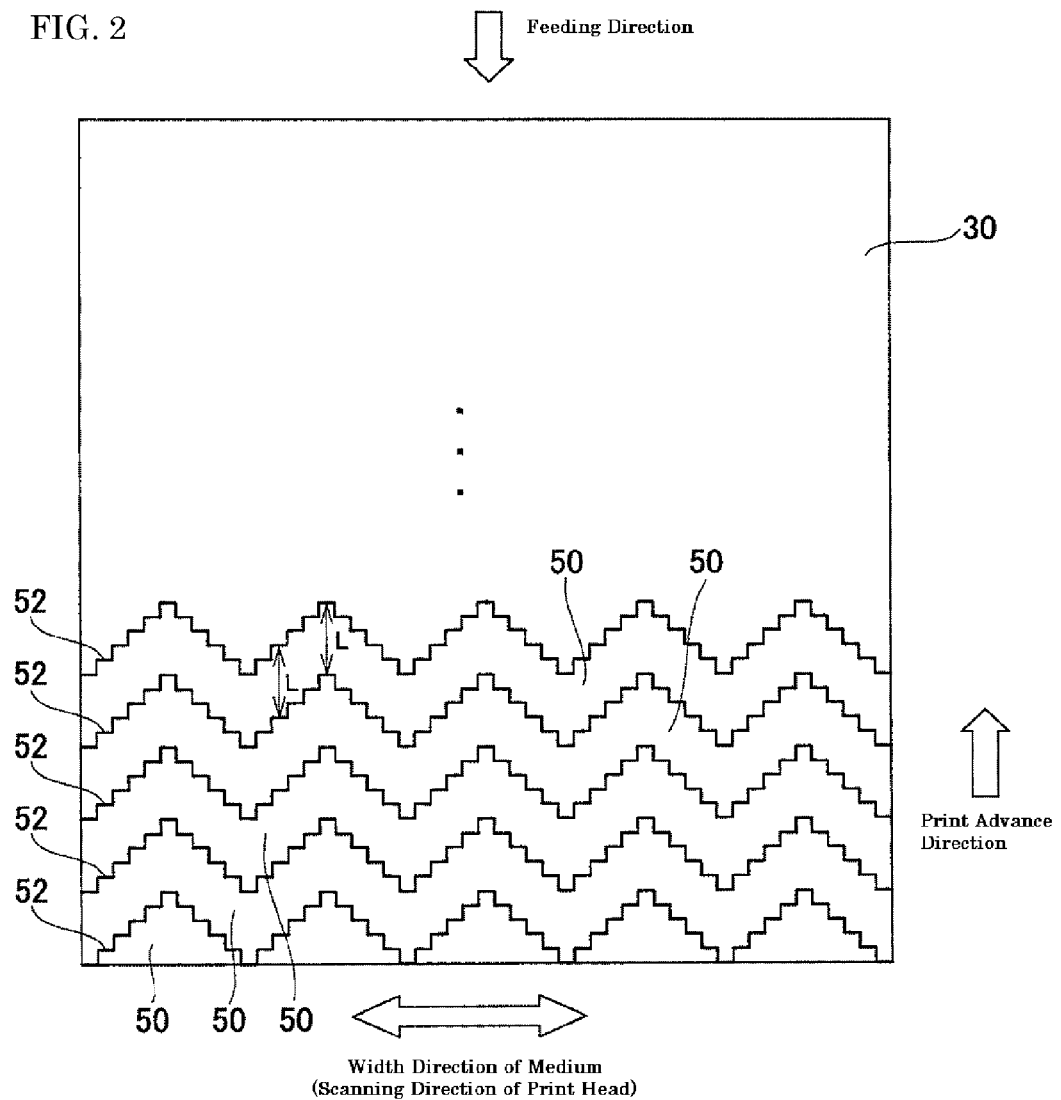

Width Direction of Medium

PRINTER AND PRINTING METHOD

CROSS-REFERENCE TO RELATED APPLICATION

The present application claims priority to Japanese Application No. 2007-131305, filed on May 17, 2007, the entire contents of which are herein incorporated by reference.

BACKGROUND OF THE INVENTION

1. Field of the Invention

The present invention generally relates to printers and printing methods.

2. Discussion of the Background

Printing methods are known that use a plurality of printing passes, for example, as set forth in JP2003-145731 and JP2006-110750. In one such printing method, a print head is used for printing on a printing zone including a plurality of printing passes, and a feeding action of feeding a medium for a distance corresponding to a swath width equal to the printing pass and a printing action of printing on the medium, while moving the print head for scanning in the width direction, are repeated.

However, in such printers, there may be errors in the feeding distance of the medium and in the scanning width of the print head. If there is an error, due to the use of a plurality of printing passes for printing, some printing passes may be overlapped with each other or clearances may be formed between them, thus resulting in the formation of "banding" areas where the printing passes appear to form stripes. However, if the banding is noticeable, it may be impossible to obtain a desired printing quality. Therefore, there is a need for a printer and printing method that uses a plurality of printing passes, but does not produce noticeable banding.

SUMMARY OF THE INVENTION

According to an aspect of the present invention, a printer is provided that includes a feeding unit configured to perform repeated feeding of a medium for a predetermined feeding distance in a predetermined feeding direction, a print head configured to print on a printing surface of the medium in a printing zone set each time the feeding unit performs a feeding of the medium for the feeding distance, and a printing pass setting unit configured to set the printing zone containing a plurality of printing passes. The printing pass setting unit is configured to set the printing passes such that boundaries between the printing passes extend diagonally relative to a width direction of the medium, where the width direction is perpendicular to the feeding direction of the medium.

According to another aspect of the present invention, a printer is provided that includes a feeding unit configured to perform repeated feeding of a medium for a predetermined feeding distance in a predetermined feeding direction, a print head configured to print on a printing surface of the medium in a printing zone set each time the feeding unit performs a feeding of the medium for the feeding distance, and a printing pass setting unit configured to set the printing zone containing a plurality of printing passes. The printing pass setting unit is configured to set the printing passes such that boundaries between the printing passes extend in waveform in a width direction of the medium, where the width direction is perpendicular to the feeding direction of the medium, and oscillation of the waveform is in the feeding direction.

According to a further aspect of the present invention, a printing method is provided that includes performing repeated feeding of a medium for a predetermined feeding distance in a predetermined feeding direction, and setting a printing zone containing a plurality of printing passes each time the medium is fed for the feeding distance, such that boundaries between the printing passes extend diagonally relative to a width direction of the medium, where the width direction is perpendicular to the feeding direction of the medium. The printing method further includes printing on a printing surface of the medium in the set printing zone set each time the medium is fed for the feeding distance.

According to a yet further aspect of the present invention, a printing method is provided that includes performing repeated feeding of a medium for a predetermined feeding distance in a predetermined feeding direction, and setting a printing zone containing a plurality of printing passes each time the medium is fed for the feeding distance, such that boundaries between the printing passes extend in waveform in a width direction of the medium, where the width direction is perpendicular to the feeding direction of the medium, and oscillation of the waveform is in the feeding direction. The printing method further includes printing on a printing surface of the medium in the set printing zone set each time the medium is fed for the feeding distance.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 2 is an illustration showing an example of printing passes 50 to be set by a printing pass setting unit 104;

FIGS. 3A and 3B are illustrations for explaining the printing of a multi-pass printing method, wherein FIG. 3A shows an example of the structure of a print head 106 and FIG. 3B shows an example of the method of printing plural times at each position on a medium 30; and FIGS. 4A and 4B are illustrations showing an example of association between nozzles 302 of the print head 106 and the printing passes 50, wherein FIG. 4A shows alignments of the nozzles 302 which are assigned to the ink ejection zones 402a through 402d and FIG. 4B shows an example of a change of the boundary 52 between the printing passes 50 according to the changes in positions of the respective ink ejection zones 402a through 402d.

DETAILED DESCRIPTION OF EMBODIMENTS OF THE INVENTION

Figure 1:
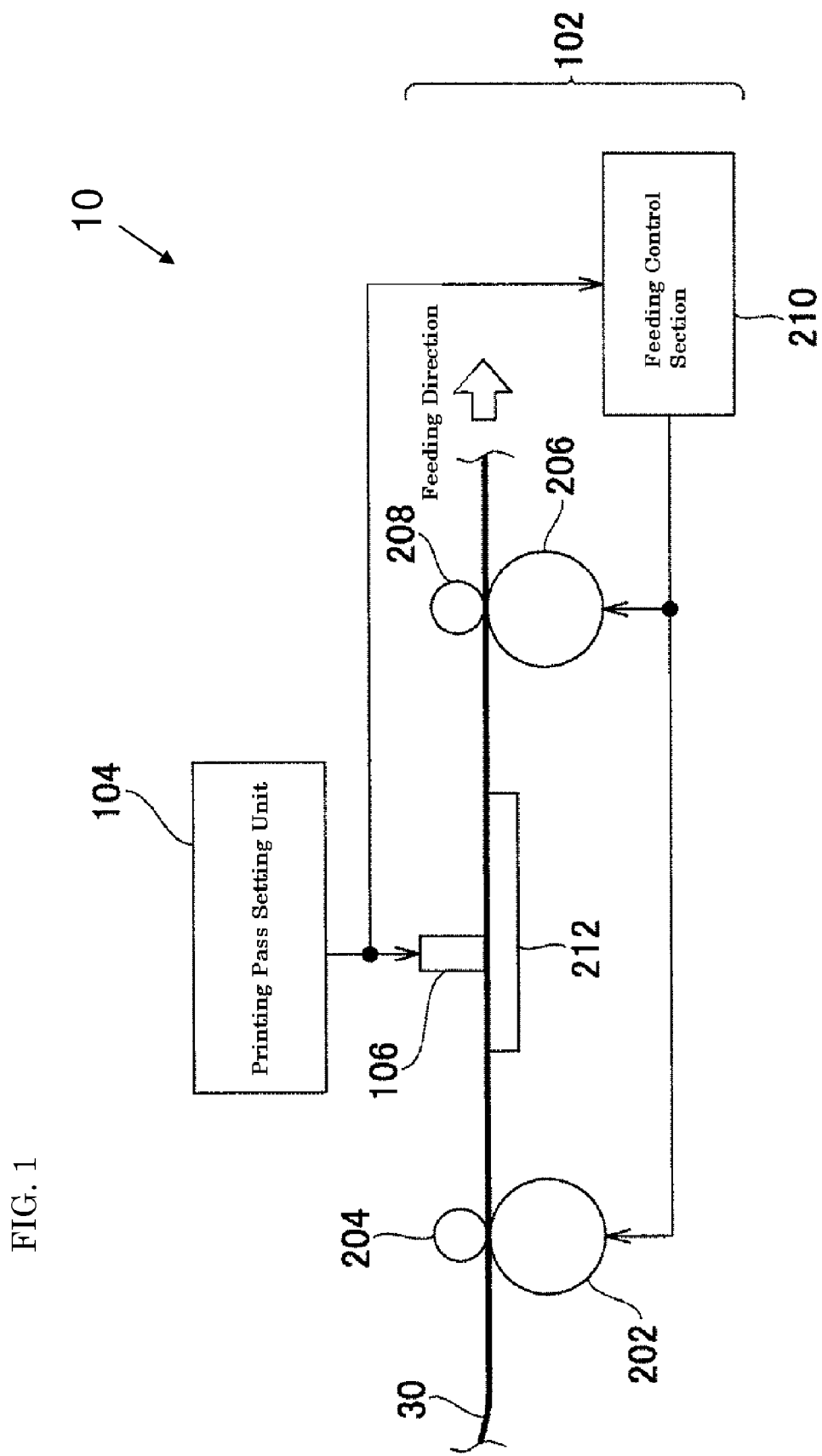
FIG. 1 is an illustration showing a structural example of a printer 10 according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

According to an aspect of the invention, a printer and printing method are provided that use a plurality of printing passes, but do not produce noticeable banding.

In a first embodiment of the invention, a printer of a type in which a plurality of printing passes are used to print at each position on a medium is provided, where the printer includes a feeding unit that repeats feeding of the medium for a predetermined feeding distance in a predetermined feeding direction, a print head that prints on a printing zone set on the medium every time the feeding unit feeds the medium for the feeding distance, and a printing pass setting unit that sets the printing passes such that boundaries between the printing passes extend diagonally relative to the width direction of the medium perpendicular to the feeding direction on the printing surface of the medium so as to set a printing zone containing the printing passes.

In a case in which printing is performed with a plurality of printing passes, if there is an error in feeding distance of the medium or the like, displacement of the printing passes in the feeding direction may occur, which can result in clearance or overlapping between adjacent printing passes. In such a case, when boundaries between the printing passes extend linearly in the width direction of the medium, the width of the clearance or overlapping between the printing passes extending along the boundaries is directly influenced by the error in feeding distance of the medium.

In a case in which the boundaries between the printing passes extend diagonally relative to the width direction of the medium, even if there is an error in the feeding distance or the like of the medium, the direction of the error does not coincide with the width direction of the clearance and overlapping between the printing passes. Therefore, the error does not directly influence the width of the clearance or overlapping between the printing passes.

For example, assuming that an angle between the extending direction of the boundaries between the printing passes and the width direction of the medium is θ, the width of the clearance or overlapping between the printing passes can be, for example, a value obtained by multiplying the error in the feeding distance with cos θ. Therefore, even if there is an error in the feeding distance, this arrangement reduces the width of the clearance or overlapping between the printing passes. In a case in which a plurality of printing passes are used to print, the reduction in the clearance or overlapping between the printing passes advantageously makes the banding unnoticeable.

The boundaries between the printing passes can be, for example, a curve or a polygonal curve. In a case in which the boundaries between the printing passes are a curve, the phrase "the boundaries extend diagonally relative to the width direction of the medium" means, for example, that tangents to the boundaries extend diagonally. On the other hand, in a case in which the boundaries between the printing passes are a polygonal curve, the phrase "the boundaries extend diagonally relative to the width direction of the medium" means, for example, that linear lines or curved lines along the polygonal curve extend diagonally.

In a second embodiment of the present invention, a printing pass setting unit is provided that sets the printing passes such that the boundaries between the printing passes extend in waveform in the width direction of the medium with vibrating (or oscillation) in the feeding direction. The boundaries between the printing passes can be a triangular waveform, a saw-tooth like waveform, or a sinusoidal waveform.

Such a configuration can enable suitable setting of printing passes such that the boundaries extend diagonally relative to the width direction of the medium with reducing the width of the printing passes in the feeding direction. Such a configuration can also prevent the print head, which prints relative to the printing zone containing the plurality of printing passes, from having excessively long length in the feeding direction. Further, such a configuration can make the boundaries between the printing passes visually unnoticeable. In addition, such a configuration can make the banding unnoticeable.

In a third embodiment of the present invention, a print head is provided that prints on the printing zone while scanning in the width direction of the medium. If there is an error in printing accuracy or the like with regard to a part of the print head in case that the print head scans in the width direction of the medium, then the influence of the error expands in the width direction of medium by the scanning of the print head. For example, in a case in which the print head is an inkjet head of an inkjet printer and if any nozzle has an error in the direction of ejecting ink droplets, the influence of the error expands over the entire width of the medium.

When the printing passes are set such that the boundaries extend linearly in the width direction and, for example, if a nozzle having an error in the direction of ejecting ink droplets is overlapped with a boundary between printing passes, the error influences the entire of the boundary between printing passes. Accordingly, when the printing passes are set such that the boundaries extend linearly in the width direction of the medium, the banding may be noticeable.

On the other hand, in a configuration such as the further embodiment, the boundaries between the printing passes extend diagonally relative to the width direction of the medium, which means that, even if, for example, there is an error in printing accuracy with regard to a part of the print head, the boundary between printing passes is not drawn over the entire width only by the part with the error. For example, when the print head is an inkjet head, the nozzles that draw the boundary between the printing passes vary according to the position in the width direction of the medium. Therefore, even if, for example, there is an error in printing accuracy with regard to a part of the print head, the configuration can prevent the influence of the error from expanding over the entire of the boundary between the printing passes. Therefore, such a configuration can make the banding suitably unnoticeable.

According to a fourth embodiment of the present invention, a printer is provided that is an inkjet printer, the print head is an inkjet head having a plurality of nozzles aligned in the feeding direction, the printing zone contains a plurality of the printing passes, and the printing pass setting unit selects nozzles in a certain range of the alignment of the plurality of nozzles such that the selected nozzles eject ink droplets to the printing passes contained in the printing zone, and shifts the range for selected nozzles in the feeding direction according to the position of the print head in the width direction of the medium so as to set the printing passes such that the boundaries between the printing passes extend diagonally relative to the width direction of the medium.

According to such a configuration, the position of the boundary between the printing passes can be suitably changed according to the position of the print head while the scanning of the print head. Therefore, the printing passes can be suitably set such that the boundaries between the printing passes extend diagonally relative to the width direction of the medium.

According to a fifth embodiment of the present invention, a printer is provided of a type in which a plurality of printing passes are used to print at each position on a medium, where the printer includes a feeding unit that repeats feeding of the medium for a predetermined feeding distance in a predetermined feeding direction, a print head that prints on a printing zone set on the medium every time the feeding unit feeds the medium for the feeding distance, and a printing pass setting unit that sets the printing passes such that a boundaries between the printing passes extend in waveform in the width direction of the medium perpendicular to the feeding direction on a printing surface of the medium with vibrating in the feeding direction so as to set the printing zone containing the printing passes. The boundaries between the printing passes can be a triangular waveform, a saw-tooth like waveform, a sinusoidal waveform, or a rectangular waveform.

Such a configuration can make the boundaries between the printing passes visually unnoticeable. In addition, such a configuration can make the bounding unnoticeable.

In such a configuration, the print head prints on the printing zone while scanning in the width direction of the medium, for example. In such a case, if there is an error in printing accuracy or the like with regard to a range as a part of the print head, the influence of the error expands in the width direction of the medium by the scanning of the print head. Therefore, the influence of the error expands over the boundary between the printing passes so that the banding can be noticeable. However, by making the boundaries between the printing passes in waveform according to the configuration of the fifth embodiment, the influence of the error over the entire of the boundary is prevented. Accordingly, this configuration makes the banding visually unnoticeable.

According to a sixth embodiment of the present invention, a printing method is provided in which a plurality of printing passes are used to print at each position on a medium, where the method includes repeating the feeding of a medium for a predetermined feeding distance in a predetermined feeding direction, setting the printing passes, every time the medium is fed for the predetermined feeding distance, such that boundaries between the printing passes extend diagonally relative to the width direction of the medium perpendicular to the feeding direction on the printing surface of the medium so as to set a printing zone containing the printing passes, and printing on the printing zone thus set. Such an arrangement can provide the same effects as the first embodiment.

According to a seventh embodiment of the present invention, a printing method is provided in which a plurality of printing passes are used to print at each position on a medium, where the method includes repeating the feeding of a medium for a predetermined feeding distance in a predetermined feeding direction, setting the printing passes, every time the medium is fed for the predetermined feeding distance, such that a boundaries between the printing passes extend in waveform in the width direction of the medium perpendicular to the feeding direction on a printing surface of the medium with vibrating in the feeding direction so as to set the printing zone containing the printing passes, and printing on the printing zone thus set. Such an arrangement can provide the same effects as the fifth embodiment.

Hereinafter, exemplary embodiments of the present invention will be described with reference to the attached drawings.

FIG. 1 shows a structural example of a printer 10 according to an embodiment of the present invention. The printer 10 is an inkjet printer employing a multi-pass printing method. The printer 10 conducts printing on respective positions of a medium 30, such as paper or film, by means of multiple printing passes. In this example, the printer 10 includes a feeding unit 102, a printing pass setting unit 104, and a print head 106.

The feeding unit 102 includes a plurality of driving rollers 202 and 206, a plurality of driven rollers 204 and 208, a table 212, and a feeding control section 210. The driving roller 202 and the driven roller 204 are disposed upstream of the print head 106 in the feeding direction. The driving roller 206 and the driven roller 208 are disposed downstream of the print head 106 in the feeding direction. The driving rollers 202, 206 rotate according to a command of the feeding control section 210. The driven rollers 204, 208 cooperate with the driving rollers 202, 206 to sandwich a medium 30 therebetween, and rotate according to the rotation of the driving rollers 202, 204.

Accordingly, the driving rollers 202, 206 and the driven rollers 204, 208 feed the medium 30 in the predetermined feeding direction according to a command of the feeding control section 210. The table 212 is located to face the print head 106 via the medium 30 and holds the medium 30, which is fed to the position corresponding to the print head 106 by suction, for example.

The feeding control section 210 controls the feeding of the medium 30, for example, by controlling a motor for rotating the driving rollers 202, 206. In this embodiment, the feeding control section 210 rotates the driving rollers 202, 206 such that the distance for each feeding is coincident with a swath width corresponding to a width of the printing pass in the feeding direction. The feeding control section 210 controls the driving rollers 202, 206 to repeat the rotation, corresponding to the feeding for a distance corresponding to the swath width, and controls stoppage in between the repeated feedings. Accordingly, the feeding unit 102 repeats the feeding of the medium 30 for a distance corresponding to the swath width in the feeding direction.

The printing pass setting unit 104 sets a printing zone to be printed by each printing action conducted after the feeding of the medium 30 for a distance corresponding to the swath width by setting printing passes on the medium 30. In this embodiment, the printing pass setting unit 104 sets a printing zone including a plurality of printing passes printed simultaneously at one printing action for every time the feeding unit 102 feeds the medium 30 for a distance corresponding to the swath width.

The print head 106 is, for example, an ink jet head having a plurality of nozzles aligned in the feeding direction. The print head 106 scans the printing surface of the medium 30 linearly in the width direction of the medium 30 perpendicular to the feeding direction every time the feeding unit 102 feeds the medium for a distance corresponding to the swath width, thereby printing on the printing zone set on the medium 30. According to the aforementioned structure, the printer of this example can suitably conduct printing of a multi-pass system.

FIG. 2 shows an example of printing passes 50 set by the printing pass setting unit 104. In this example, the printing pass setting unit 104 sets waveform printing passes 50, which vibrate in the feeding direction. At any position in the width direction of the medium 30, the width of the printing pass 50 in the feeding direction is equal to the swath width L of the medium 30. Boundaries 52 between the printing passes 50 extend in waveform in the width direction of the medium 30 with vibrating in the feeding direction. Therefore, at any position in the width direction of the medium 30, the boundaries 52 extend diagonally relative to the width direction of the medium 30.

By making the printing passes into waveform, the boundaries of the printing passes are visually unnoticeable. In addition, even if there is an error in the feeding distance or the like of the medium 30, the direction of the error does not coincide with the extending direction of the boundaries 52 because the boundaries of the printing passes 50 extend diagonally relative to the width direction. In this case, even if clearance or overlapping is formed between the printing passes 50 due to an error, the direction of the error does not coincide with the width direction of the clearance or overlapping so that the error does not influence directly the width of the clearance or overlapping. That is, the width of the clearance or overlapping is smaller than the error in the feeding direction. Therefore, for example, it is possible to make banding unnoticeable when printing with a plurality of printing passes 50.

It should be noted that the print head 106 prints a printing zone including a plurality (e.g., four through sixteen) of printing passes by a single printing action. The printing pass setting unit 104 associates every nozzle on the print head 106 with any of the printing passes 50 included in the printing zone according to the position of the nozzles. Further, to make the printing passes 50 into waveform, the printing pass setting unit 104 changes the associations according to the position of the print head 106 in the width direction of the medium 30. According to this structure, the waveform printing passes 50 can be suitably set.

In this example, the printing pass setting unit 104 sets printing passes 50 having boundaries 52 of polygonal-curve shape therebetween. According to this structure, for example, the frequency of changing the associations between nozzles and the printing passes 50 can be reduced. This structure also enables the print head 106 to scan at a higher speed. The printing pass setting unit 104 can set printing passes 50 having linear or curved boundaries 52 therebetween.

Figure 3A:
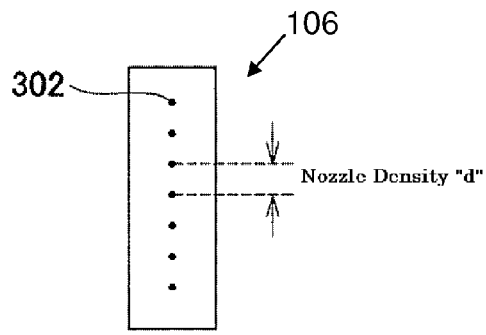
Figure 3B:
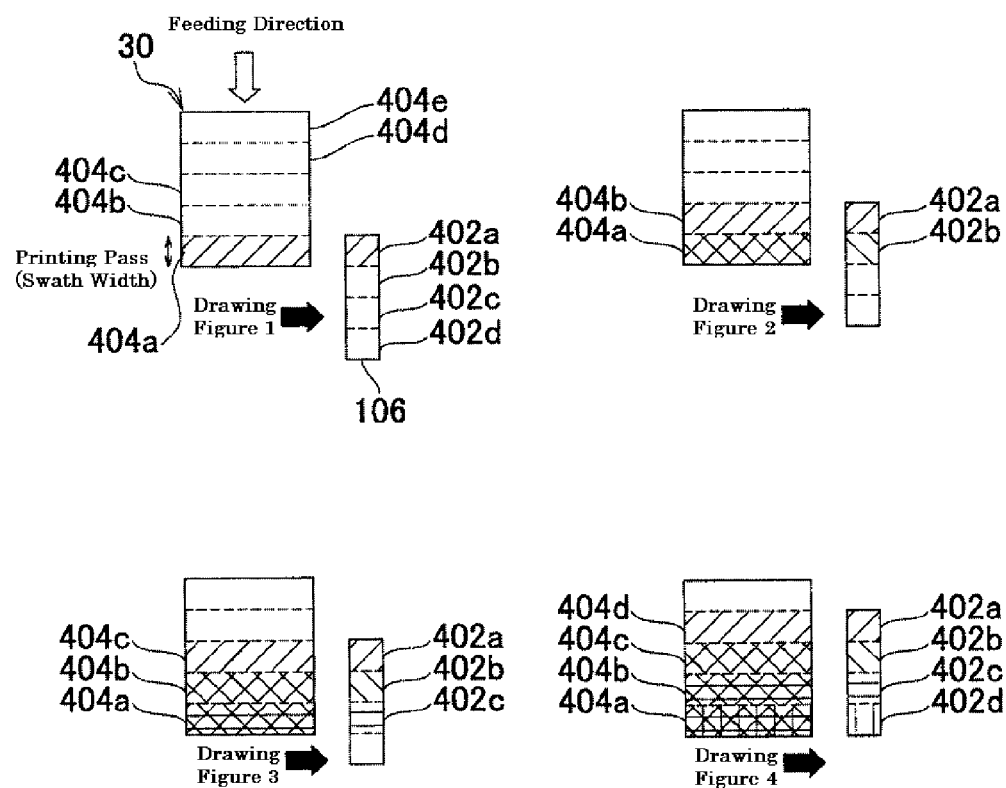

FIGS. 3A and 3B are illustrations for explaining the multi-pass printing. FIG. 3A shows an example of the structure of the print head 106. In this example, the print head 106 has a plurality of nozzles 302 aligned in the feeding direction at a constant density. The print head 106 eject ink droplets from these nozzles 302 while moving in the width direction of the medium 30, thereby printing on the medium 30.

In this example, the nozzle density "d" for aligning the nozzle 302 is lower than the printing resolution. By printing plural times at the same location on the medium 30 by means of the plural printing passes, a desired printing resolution can be obtained. The print head 106 repeats printing every time the medium 30 is fed for a distance corresponding to the swath width so as to print the same location plural times.

FIG. 3B shows an example of a method of printing plural times at each location on the medium 30. In this example, the printing pass setting unit 104 (see FIG. 1) sets pass sites 404a through 404e as the positions of the plural printing passes 50 (see FIG. 2) prior to the start of printing. The width of each of the pass sites 404a through 404e in the feeding direction is equal to the swath width. It should be noted that the printing passes 50 are waveform with vibrating in the feeding direction as described with reference to FIG. 2. Therefore, the printing pass setting unit 104 sets waveform pass sites 404a through 404e corresponding to the printing passes 50. In FIG. 3B, however, the respective pass sites 404a through 404e are shown in rectangular shape for ease of illustration.

In this example, the printing head 106 prints at each location on the medium 30 by four printing passes. That is, the print head 106 is divided into four ink ejection zones 402a through 402d in the feeding direction. The width of each of the ink ejection zones 402a through 402d in the feeding direction is equal to the swath width. Accordingly, every time the print head 106 scans in the width direction of the medium 30, each of the ink ejection zones 402a through 402d prints a single printing pass 50.

In this example, the printing pass setting unit 104 changes the boundaries among the ink ejection zones 402a through 402d according to the location of the print head 106 in the width direction of the medium 30. Therefore, the print head 106 conducts printing in accordance with the waveform printing passes 50.

Hereinafter, the printing action will be described in further detail with specifying the positional relation between the print head 106 and the medium 30. In case of printing relative to the pass sites 404a through 404e, first at a time when the position of the ink ejection zone 402a in the feeding direction becomes to be superposed on the pass site 404a, the printing pass setting unit 104 sets, for example, a printing area including the printing pass 50 corresponding to the pass site 404a and the other three printing passes 50. Then, the print head 106 scans in the width direction of the medium 30 ("Drawing FIG. 1" in FIG. 3B). During this scanning, the ink ejection zone 402a ejects ink droplets to the pass site 404a so as to print on the pass site 404a.

Then, the feeding unit 102 feeds the medium 30 for a distance corresponding to the swath width. Therefore, the positions of the pass sites 404a, 404b in the feeding direction are superposed to the ink ejection zones 402b, 402a, respectively. At this point, the printing pass setting unit 104 sets, for example, a printing area including the printing passes 50 corresponding to the pass sites 404a, 404b and the other two printing passes 50. Then, the print head 106 scans in the width direction of the medium 30 ("Drawing FIG. 2" in FIG. 3B). During this scanning, the ink ejection zones 402a, 402b eject ink droplets to the pass sites 404b, 404a so as to print on the pass sites 404b, 404a, respectively.

Then, the feeding unit 102 further feeds the medium 30 for a distance corresponding to the swath width. Therefore, the positions of the pass sites 404a through 404c in the feeding direction are superposed to the ink ejection zones 402c through 402a, respectively. At this point, the printing pass setting unit 104 sets, for example, a printing area including the printing passes 50 corresponding to the pass sites 404a through 404c and the other one printing pass 50. Then, the print head 106 scans in the width direction of the medium 30 ("Drawing FIG. 3" in FIG. 3B). During this scanning, the ink ejection zones 402a through 402c eject ink droplets to the pass sites 404c through 404a so as to print on the pass sites 404c through 404a, respectively.

Then, the feeding unit 102 further feeds the medium 30 for a distance corresponding to the swath width. Therefore, the positions of the pass sites 404a through 404d in the feeding direction are superposed to the ink ejection zones 402d through 402a, respectively. At this point, the printing pass setting unit 104 sets, for example, a printing area including the printing passes 50 corresponding to the pass sites 404a through 404d. Then, the print head 106 scans in the width direction of the medium 30 ("Drawing FIG. 4" in FIG. 3B). During this scanning, the ink ejection zones 402a through 402d eject ink droplets to the pass sites 404d through 404a so as to print on the pass sites 404d through 404a, respectively.

At this point, printing on the pass site 404a is completed as to every printing pass (i.e. all of the four printing passes in this embodiment). After this, the action as mentioned above is repeated, thereby sequentially printing on the other pass sites 404b through 404e as to the remaining printing passes.

Figure 4A:
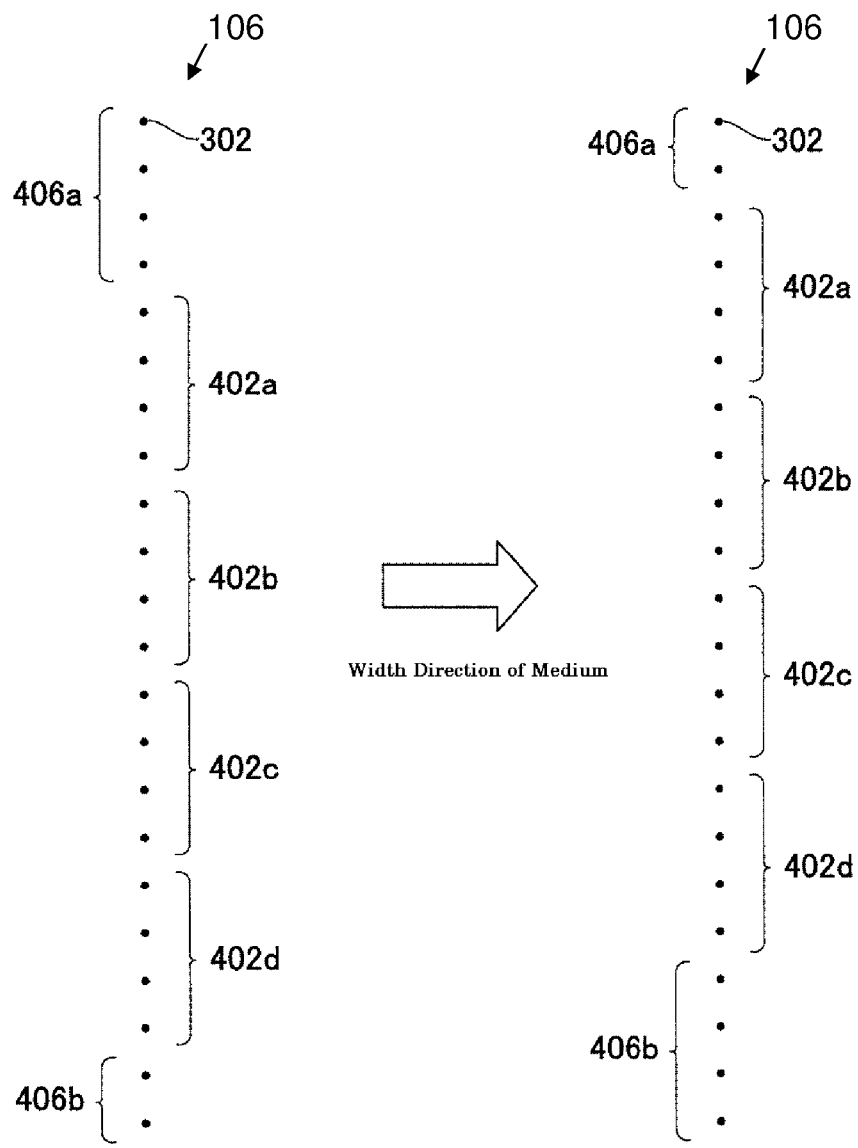
Figure 4B:
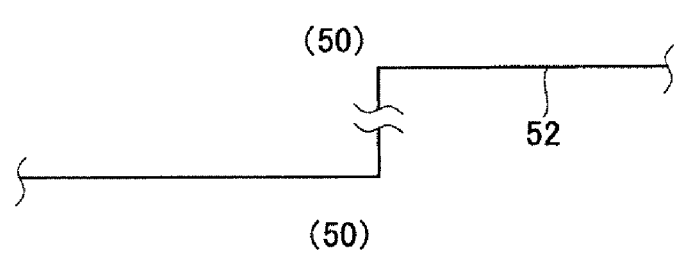

FIGS. 4A and 4B show an example of association between nozzles 302 of the print head 106 and the printing passes 50. FIG. 4A shows alignments of the nozzles 302 which are assigned to the ink ejection zones 402a through 402d. In this example, the printing pass setting unit 104 sorts the nozzles 302 aligned in the feeding direction into a dummy nozzle zone 406a, the ink ejection zones 402a through 402d, and a dummy nozzle zone 406b. The ink ejection zones 402a through 402d each contain a same number of nozzles 302. The printing pass setting unit 104 associates the nozzles 302 contained in the respective ink ejection zones 402a through 402d with the four printing passes 50 to be simultaneously printed. Therefore, the printing pass setting unit 104 selects nozzles 302, contained in the respective ink ejecting zones 402a through 402d, as the nozzles 302 which eject ink droplets to the four printing passes 50 contained in the printing area, respectively. The printing pass setting unit 104 sets nozzles 302, contained in the dummy nozzle zones 406a, 406b, as the dummy nozzles which do not eject ink droplets.

The printing pass setting unit 104 changes the borders among the dummy nozzle zone 406a, the ink ejection zones 402a through 402d, and the dummy nozzle zone 406b according to the position of the scanning print head 106 (see FIG. 1) in the width direction of the medium 30, thereby changing the nozzles 302 to be associated with the respective printing passes 50. For example, the printing pass setting unit 104 shifts the positions of the respective ink ejection zones 402a through 402d in the feeding direction every time the print head 106 moves a certain distance. Accordingly, the printing pass setting unit 104 sequentially changes the ranges of the nozzles 302 to be associated with the respective printing passes 50 according to the position of the print head 106 in the width direction of the medium 30.

The printing pass setting unit 104 changes the ranges of the dummy nozzle zones 406a, 406b according to the changes of the positions of the ink ejection zones 402a through 402d. This enables the respective ink ejection zones 402a through 402d to be shifted without changing their sizes. The number of the nozzles 302 shown in FIG. 4A is simplified. The ink ejection zones 402a through 402d and the dummy nozzle zones 406a, 406b contain, for example, a larger number of nozzles 302 than shown in FIG. 4A.

FIG. 4B shows an example of a change of a boundary 52 between the printing passes 50 according to the changes of the respective ink ejection zones 402a through 402d. As the positions of the ink ejection zones 402a through 402d are shifted in the feeding direction, the boundary 52 between the printing passes 50 is also shifted in the feeding direction in step-like manner. According to this example, the position of the boundary 52 between the printing passes 50 can be changed according to the position of the print head 106 while moving the print head 106 for scanning.

The printing pass setting unit 104 sequentially shifts the ink ejection zones 402a through 402d in the feeding direction so as to sequentially shift the boundary 52 between the printing passes 50 in step-like manner. Accordingly, the boundary 52 extends diagonally like a polygonal curve relative to the width direction of the medium 30. Thus, the printing pass setting unit 104 sets the printing passes 50 such that the boundaries 52 between the printing passes 50 extend diagonally relative to the width direction of the medium 30.

The printing pass setting unit 104 reverses the direction of shifting the positions of the ink ejection zones 402a through 402d every time the boundary 52 is shifted a certain number of times in the step-like manner. Therefore, the boundaries 52 between the printing passes 50 are formed in waveform vibrating (or oscillating) in the feeding direction. According to this example, the waveform printing passes 50 are suitably set.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A printer comprising:
   a feeding unit configured to perform repeated feeding of a medium for a predetermined feeding distance in a predetermined feeding direction;
   a print head configured to print on a printing surface of the medium in a printing zone set each time said feeding unit performs a feeding of the medium for the feeding distance; and
   a printing pass setting unit configured to set the printing zone containing a plurality of printing passes, said printing pass setting unit being configured to set said printing passes such that boundaries between said printing passes extend diagonally relative to a width direction of the medium, the width direction being perpendicular to the feeding direction of the medium,
   wherein said print head is configured to print in the printing zone while scanning in the width direction of the medium,
   wherein said printer is an inkjet printer,
   wherein said print head is an inkjet head having a plurality of nozzles aligned in the feeding direction, and
   wherein said printing pass setting unit is configured to select nozzles in a certain range of alignment of said plurality of nozzles such that the selected nozzles eject ink droplets to said printing passes contained in said printing zone, and said printing pass setting unit is configured to shift said range for the selected nozzles in the feeding direction according to a position of said print head in the width direction of the medium so as to set said printing passes such that said boundaries between said printing passes extend diagonally relative to the width direction of the medium.

2. The printer according to claim 1, wherein said printing pass setting unit is configured to set said printing passes such that the boundaries between said printing passes extend in waveform in the width direction of the medium with oscillation of the waveform being in the feeding direction.

3. A printer comprising:
   a feeding unit configured to perform repeated feeding of a medium for a predetermined feeding distance in a predetermined feeding direction;
   a print head configured to print on a printing surface of the medium in a printing zone set each time said feeding unit performs a feeding of the medium for the feeding distance; and
   a printing pass setting unit configured to set the printing zone containing a plurality of printing passes, said printing pass setting unit being configured to set said printing passes such that boundaries between said printing passes extend in waveform in a width direction of the medium, the width direction being perpendicular to the feeding direction of the medium, and oscillation of the waveform being in the feeding direction,
   wherein said printer is an inkjet printer,
   wherein said print head is an inkjet head having a plurality of nozzles aligned in the feeding direction, and
   wherein said printing pass setting unit is configured to select nozzles in a certain range of alignment of said plurality of nozzles such that the selected nozzles eject ink droplets to said printing passes contained in said printing zone, and said printing pass setting unit is configured to shift said range for the selected nozzles in the feeding direction according to a position of said print head in the width direction of the medium so as to set said printing passes such that said boundaries between said printing passes extend in the waveform in the width direction of the medium.

4. The printer according to claim 3, wherein said print head is configured to print in the printing zone while scanning in the width direction of the medium.

5. A printing method comprising:

performing repeated feeding of a medium for a predetermined feeding distance in a predetermined feeding direction;

setting a printing zone containing a plurality of printing passes each time the medium is fed for the feeding distance, such that boundaries between said printing passes extend diagonally relative to a width direction of the medium, the width direction being perpendicular to the feeding direction of the medium; and printing on a printing surface of the medium in the set printing zone set each time the medium is fed for the feeding distance, wherein the printing in the set printing zone is performed while scanning in the width direction of the medium, wherein the printing is performed using an inkjet print head having a plurality of nozzles aligned in the feeding direction, and wherein the setting of the printing zone containing the plurality of printing passes includes selecting nozzles in a certain range of alignment of the plurality of nozzles such that the selected nozzles eject ink droplets to the printing passes contained in the printing zone, and shifting the range for the selected nozzles in the feeding direction according to a position of the inkjet print head in the width direction of the medium so as to set the printing passes such that the boundaries between the printing passes extend diagonally relative to the width direction of the medium.

6. The printing method according to claim 5, wherein said printing passes are set such that the boundaries between said printing passes extend in waveform in the width direction of the medium with oscillation of the waveform being in the feeding direction.

7. A printing method comprising:

performing repeated feeding of a medium for a predetermined feeding distance in a predetermined feeding direction;

setting a printing zone containing a plurality of printing passes each time the medium is fed for the feeding distance, such that boundaries between said printing passes extend in waveform in a width direction of the medium, the width direction being perpendicular to the feeding direction of the medium, and oscillation of the waveform being in the feeding direction; and printing on a printing surface of the medium in the set printing zone set each time the medium is fed for the feeding distance, wherein the printing is performed using an inkjet print head having a plurality of nozzles aligned in the feeding direction, and wherein the setting of the printing zone containing the plurality of printing passes includes selecting nozzles in a certain range of alignment of the plurality of nozzles such that the selected nozzles eject ink droplets to the printing passes contained in the printing zone, and shifting the range for the selected nozzles in the feeding direction according to a position of the inkjet print head in the width direction of the medium so as to set the printing passes such that the boundaries between the printing passes extend in the waveform in the width direction of the medium.

8. The printing method according to claim 7, wherein the printing in the set printing zone is performed while scanning in the width direction of the medium.

* * * * *